United States Patent
Rustad et al.

(10) Patent No.: US 6,629,164 B1
(45) Date of Patent: Sep. 30, 2003

(54) CHARACTER COUNTER AND MATCH REGISTERS IN A SERIAL INTERFACE

(75) Inventors: Mark D. Rustad, Edina, MN (US); Scott A. Davidson, Savage, MN (US); Jeffrey T. Rabe, Minnetonka, MN (US); Robert J. Lipe, Franklin, TN (US); Gary A. Groven, Edina, MN (US)

(73) Assignee: Digi International Inc., Minnetonka, MN (US)

( * ) Notice: Subject to any disclaimer, the term of this patent is extended or adjusted under 35 U.S.C. 154(b) by 0 days.

(21) Appl. No.: 09/437,675

(22) Filed: Nov. 10, 1999

(51) Int. Cl.[7] ............................................... G06F 13/00

(52) U.S. Cl. ............................ 710/34; 710/22; 710/29; 710/57

(58) Field of Search .............................. 710/57, 34, 22, 710/29, 28, 52

(56) References Cited

U.S. PATENT DOCUMENTS

| | | | |
|---|---|---|---|
| 3,845,474 A | 10/1974 | Lange et al. | 340/172.5 |
| 4,035,777 A | 7/1977 | Moreton | 364/200 |
| 4,151,592 A | 4/1979 | Suzuki et al. | 364/200 |
| 4,774,625 A | 9/1988 | Yamanaka | 710/110 |
| 5,353,338 A | 10/1994 | Nakano et al. | 379/99 |
| 5,371,858 A | 12/1994 | Miller et al. | 395/275 |
| 5,452,432 A * | 9/1995 | Macachor | 710/22 |

(List continued on next page.)

FOREIGN PATENT DOCUMENTS

EP 0563621 10/1993 ........... G06F/11/00

OTHER PUBLICATIONS

"MC68030 Enhanced 32–Bit Microprocessor User's Manual, 3rd Edition", Section 6, *Published by Motorola* (1992).
"PowerPC 601 RISC Microprocessor User's Manual", Chapter 4; Sections 4.7.2 through 4.7.9, *Available from IBM and Motorola.*
"TinyRISC TR4101 Building Blocks Technical Manual", Published by LSI Logic, (Jan. 2000).
"TinyRISC TR4101 Microprocessor Core Technical Manual", Published by LSI Logic, (Dec. 1999).
Tanenbaum, Andrew, S., "Operating Systems: Design and Implementation", *Section 2.2.3: Mutual Exclusion with Busy Waiting*, Prentice–Hall, Inc., Englewood Cliffs, New Jersey, pp. 53–57, (1987).

*Primary Examiner*—Jeffrey Gaffin
*Assistant Examiner*—Harold Kim
(74) *Attorney, Agent, or Firm*—Schwegman, Lundberg, Woessner & Kluth, P.A.

(57) ABSTRACT

A method is described for controlling commands and data in a serial data stream received by a serial controller in a serial interface. A character count register is programed with a maximum number of characters that a serial controller will send to a direct memory access controller (DMAC) before sending an end of frame (EOF) indication. Characters in an incoming data stream are counted using the character count register. An EOF signal is passed to the DMAC after the maximum number of characters programmed in the character count register have been written to a direct memory access (DMA) buffer. The character count register is reset any time the serial controller passes an EOF to the DMAC. In one embodiment, a character is programmed into a match register. Data in an incoming data stream is compared with the character in the match register. When a character in the incoming data stream matches the character programmed in the match register, a match bit is set corresponding to the match register. The match bit as part of a next end of frame (EOF) indication sent by a serial controller to a direct memory access controller (DMAC).

11 Claims, 3 Drawing Sheets

U.S. PATENT DOCUMENTS

| | | | |
|---|---|---|---|
| 5,459,754 A | 10/1995 | Newby et al. | 375/368 |
| 5,497,501 A * | 3/1996 | Kohzono et al. | 710/29 |
| 5,561,816 A * | 10/1996 | Mitsuhira et al. | 710/22 |
| 5,613,153 A | 3/1997 | Arimilli et al. | 395/821 |
| 5,694,575 A | 12/1997 | Oba et al. | 395/473 |
| 5,734,684 A | 3/1998 | Matsui | 375/340 |
| 5,761,453 A * | 6/1998 | Anderson et al. | 710/308 |
| 5,991,831 A * | 11/1999 | Lee et al. | 710/33 |
| 6,029,202 A | 2/2000 | Frazier et al. | 709/232 |
| 6,058,474 A * | 5/2000 | Baltz et al. | 713/1 |
| 6,105,086 A * | 8/2000 | Doolittle et al. | 710/52 |
| 6,134,607 A * | 10/2000 | Frink | 710/22 |
| 6,298,396 B1 * | 10/2001 | Loyer et al. | 710/22 |

\* cited by examiner

CHARACTER COUNTER AND MATCH REGISTERS IN A SERIAL INTERFACE

CROSS REFERENCE TO RELATED APPLICATIONS

The present application is related to the following co-pending application: U.S. Ser. No. 09/437,413, filed Nov. 10, 1999 entitled "FLOW CONTROL", which application is incorporated herein by reference.

TECHNICAL FIELD OF THE INVENTION

The present invention relates generally to the field of telecommunications and, in particular, to flow control in communication circuits.

BACKGROUND

In recent years, computers have become a commonplace part of life for large segments of society. Many businesses and other groups or institutions rely on vast networks of computers to share data among large numbers of users. To communicate with each other, these computers and other network devices generate serial data streams that are communicated over some medium such as a telephone line, local area network or other appropriate medium.

A serial data stream can include data as well as commands that control the communication between end stations. This is referred to as "in-band communication." These commands are typically transmitted over the same transmission medium as the data and, in fact, look just like regular data. Thus, the end stations must be able to distinguish between two modes of communication: a command mode and a data mode. Data that is not intended as a command but that could be interpreted as a command is typically preceded by a signal indicating that the communication is transitioning between command and data modes.

A receiving end station for the serial data stream includes a serial port card. The serial port card includes a serial controller. The serial controller includes serial ports which are adapted to receiving synchronous and asynchronous protocols. The serial controller stores the serial data in direct memory access (DMA) buffers in cooperation with a direct memory access controller (DMAC). The DMAC is designed to communicate status information about the serial data to processors. Status communicated to the DMAC from the serial controller is referred to as an end of frame (EOF), or status signal. The DMAC takes special actions when it encounters an EOF in the serial data stream. The data associated with the EOF is combined with other status in the DMA controller and stored in the current DMA descriptor and operation resumes with the next DMA descriptor.

Each DMA buffer is associated with a DMA descriptor. When a DMA buffer fills with serial data, the serial data stream rolls into the next DMA buffer which is assigned a next DMA descriptor. With large serial data streams the potential exists to fill a DMA buffer before an EOF. Therefore, every DMA buffer descriptor is not assured of containing status information (e.g., an EOF) that applies to the data in the buffer.

Commands can be used for in-band "flow control" in the serial communication between end stations. In-band flow control relates to controlling the transmission and receipt of data over a serial communication link. In-band flow control is typically used with asynchronous data ports. One command that is typically provided in command mode is the "XOFF" command or its equivalent. This command allows one end station to instruct the other end station to cease transmitting data over the serial communication link. Another command that is typically provided includes the start/resume data transmission command, "XON" command.

The speed and accuracy with which an end station responds to the XOFF, or XON, command provides competing concerns for system designers. For example, some systems respond quickly to anything in the data path that looks like an XOFF command. Unfortunately, this can result in an unwanted interruption in the communication link when data is mistakenly interpreted as an XOFF command. Alternatively, some systems use procedures to assure that data that matches the XOFF command was sent in command mode before responding to the command. At today's ever increasing data rates, this can result in data loss and other problems due to the time delay in processing the data to interpret the command. These speed and accuracy concerns make it important that a command be readily identifiable with a specific buffer descriptor.

Similarly, when specific data needs to be quickly located and processed, it is important that the data can be immediately located in a specific descriptor. Without a status in each buffer descriptor, the search becomes more cumbersome.

For the reasons stated above, and for other reasons stated below which will become apparent to those skilled in the art upon reading and understanding the present specification, there is a need in the art for improved flow control for a serial communication link. It is desirable that a serial port card generates status information in such a way that it be quickly located and acted upon.

SUMMARY

The above mentioned problems with flow control and other problems are addressed by the present invention and will be understood by reading and studying the following specification. Systems and methods are described which includes character counters and match registers which allow commands and data to be associated with a specific buffer descriptor. In this manner, important commands and data can be more quickly located and processed.

In particular, an illustrative embodiment of the present invention includes a method for controlling commands and data in a serial port card. The method includes programming a character count register with a maximum number of characters that a serial controller will send to a direct memory access controller (DMAC) between an end of frame (EOF) indication, or status signal. Characters in an incoming data stream are counted using the character count register. An EOF signal is passed to the DMAC after the maximum number of characters have been written to a direct memory access (DMA) buffer. The method further includes resetting the character count register any time the serial controller passes an EOF to the DMAC.

In another illustrative embodiment, a method for controlling commands and data in a serial port card includes programming a character into a match register. The method includes monitoring an incoming data stream. Data in the data stream is compared with the character in the match register. When a character in the incoming data stream matches the character programmed in the match register, a match bit is set corresponding to the match register. The method further includes sending the match bit as part of a next end of frame (EOF) indication sent by a serial controller to a direct memory access controller (DMAC).

DETAILED DESCRIPTION

The following detailed description refers to the accompanying drawings which form a part of the specification. The drawings show, and the detailed description describes, by way of illustration specific illustrative embodiments in which the invention may be practiced. These embodiments are described in sufficient detail to enable those skilled in the art to practice the invention. Other embodiments may be used and logical, mechanical and electrical changes may be made without departing from the scope of the present invention. The following detailed description is, therefore, not to be taken in a limiting sense.

Figure 1:
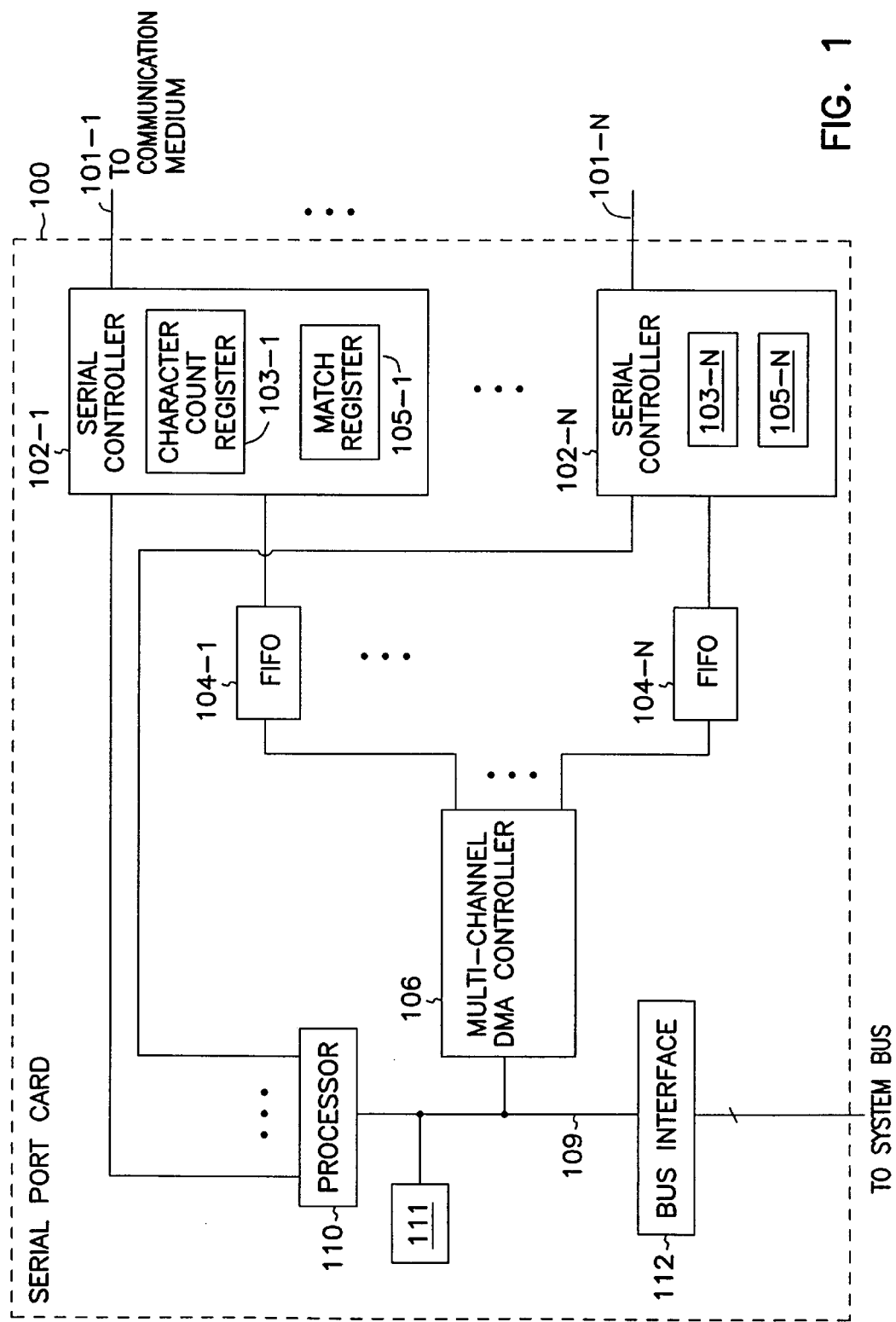
FIG. 1 is a block diagram of one embodiment of a serial interface constructed according to the teachings of the present invention.

FIG. 1 is a block diagram of one embodiment of a serial interface or electronic system, indicated generally at 100, and constructed according to the teachings of the present invention. As shown in FIG. 1, the serial interface 100 includes at least one, but can further contain a number of serial controllers 102-1, 102-2, . . . , 102-N. Each serial controller, 102-1, 102-2, . . . , 102-N is coupled to a serial port, shown as 101-1, 101-2, 101-3, . . . , 101-N. In one embodiment, each serial port is configurable as a synchronous or an asynchronous serial port. Any number of serial ports and serial controllers can be included in the scope of the present invention, the same is not so limited. At least one serial controller, e.g. serial controller 102-1, includes a character count register 103-1 and a match register 105-1. In one embodiment, each serial controller, 102-1, 102-2, . . . , 102-N, includes a character count register, 103-1, 103-2, . . . , 103-N and similarly includes a match register, 105-1, 105-2, . . . , 105N.

For purposes of describing the present invention only one serial controller, e.g. 102-1, is discussed in detail. However, it is understood that the description provided can similarly serve as a description of each serial controller in a serial interface having a number of serial controllers. In one embodiment of the present invention, the character count register 103-1 of serial controller 102-1 includes a programmable firmware character count register 103-1. In one embodiment, the match register 105-1 includes a programmable firmware match register 105-1. A pair of DMA channels are coupled to each serial controller, 102-1, 102-2, . . . , 102-N. As shown in FIG. 1, the serial interface 100 includes a multi-channel direct memory access controller (DMAC) 106 for providing the DMA channels. The multi-channel DMAC 106 provides the DMA channels between the serial controllers, 102-1, 102-2, . . . , 102-N, a processor 110, and a memory 111. The memory 111 contains a number of DMA buffers, not shown, for the multi-channel DMAC 106. In one embodiment, a number of first in first out (FIFO) buffers 104 are coupled to the number of serial controllers 102-1, 102-2, . . . , 102-N and the DMAC 106 is coupled to the number of FIFO buffers 104.

As shown in FIG. 1, a local bus 109 is provided coupling the processor 110 to the multi-channel DMAC 106, the memory 111, and a bus interface 112 for connections external to the serial interface 100. Bus interface 112 comprises, for example, a peripheral component interconnect (PCI) bus interface so that serial interface 100 can be plugged into a computer that supports the PCI standard. In other embodiments, other appropriate bus interfaces can be provided. In one embodiment, memory 111 includes a static random access memory (SRAM). As one of ordinary skill in the art will understand upon reading this disclosure, other suitable types of memory can be included as memory 111. Further, the processor 110 can include a cache memory.

According to the teachings of the present invention, the multi-channel DMAC 106 processing is logically separate from the serial controller processing. The DMAC 106 provides for communication of status information through the DMAC. Status communicated through the multi-channel DMAC 106 is referred to as an end of frame (EOF), or status signal. According to the teachings of the present invention, the multi-channel DMAC 106 can take special actions when it encounters an EOF. Typically, data associated with the EOF is combined with other status in the multi-channel DMAC 106 and stored in the current DMA descriptor and operation resumes with the next DMA descriptor. The multi-channel DMAC 106 associates a DMAC descriptor, or buffer descriptor, with each DMA buffer in the memory.

In one embodiment, the character count register 103-1 is programmed to control the number of characters, received by the serial controller 102-1 in a serial data stream, that the serial controller 102-1 will send to the multi-channel DMAC before including an EOF signal. For example, the character count register 103-1 can be programmed with the maximum number of characters that the serial controller 102-1 will send to the DMAC between an EOF signal. According to the teachings of the present invention, the character count register 103 is programmed to send an EOF signal, or status signal, to the DMAC 106 before the number of characters received at a serial port of the serial controller 102-1 exceeds the size of a DMA buffer associated with a single DMA descriptor. In other words, the character count register 103-1 is programmed with a maximum number of characters which is less than a size of a DMA buffer in memory 111 associated with a single DMA descriptor. In one embodiment, the character count register 103-1 is a twelve-bit programmed character count register.

In operation, the character count register 103-1 counts that characters in an incoming data stream received at a serial port 101-1 of the serial controller 102-1. When the maximum number of characters programmed into the character count register 103-1 have been written to, or received in, a DMA buffer in memory 111, the serial controller 102-1 passes an EOF signal to the multi-channel DMAC 106. According to the teachings of the present invention, the character count register 103-1 is then reset, to re-start counting, any time the serial controller passes an EOF to the DMAC 106. As explained above, passing the EOF signal to the DMAC 106 includes passing a status to the DMAC 106. Thus, every buffer descriptor has status from a serial controller, e.g. 102-1 applied to it which applies only, or solely, to that buffer descriptor. This avoids advancing to the next buffer descriptor, due to a particular buffer being filled, without including a status in the buffer associated with, or relating only to, that specific buffer descriptor. According to one embodiment, passing the EOF signal to the multi-channel DMAC 106 includes advancing the DMAC 106 to a next buffer descriptor.

The match register 105-1, according to the teachings of the present invention, includes a programmed character. In one embodiment, the programmed character includes a "command" character. For example, the command character can include a command character for halting, or stopping, the transmission of the serial data to the serial interface 100, e.g. an "XOFF" command. In another embodiment, the command character can include a command for starting, or re-starting, the transmission of serial data to the serial interface 100. In an alternative embodiment, the command character can include a command character for forcing an EOF, e.g. an "LNEXT," or "EOF" command. In one embodiment, a character is programmed into at least three independent match registers 105-1A, 105-1B, and 105-1C in the serial controller 102-1. According to the teachings of the present invention, each independent match register 105-1A, 105-1B, and 105-1C can contain a different programmed character. For example, one match register 105-1A can include the "XOFF" command character, another 105-1B the "XON" command character, and the third match register 105-1C can include an "EOF" command character which is used in point to point protocol (PPP).

In operation, the serial controller 102-1 monitors an incoming data stream received at a serial port 101-1 of the serial controller 102-1. The incoming data stream is compared with the character in the match register 105-1. In one embodiment, the match register 105-1 is programmed to set a match bit corresponding to the match register 105-1 when a character in the incoming data stream matches the programmed character in the match register 105-1. This match bit is then sent as part of the next EOF signal sent by the serial controller 102-1 to the DMAC 106. In this manner, the match register 105-1 is programmed to enable the processor to perform an action on an incoming data stream received by the serial interface 100. For example, the match register 105-1 can be programmed with a halt transmission command, such as "XOFF", to enable, or signal, the processor to halt a transmission to the serial interface 100 when a character in an incoming data stream matches this programmed character in the match register 105-1. One of ordinary skill in the art will understand upon reading this disclosure the wide range of characters, either in data or command form, which can be programmed into the match register 105-1.

METHODS OF OPERATION

Figure 2:
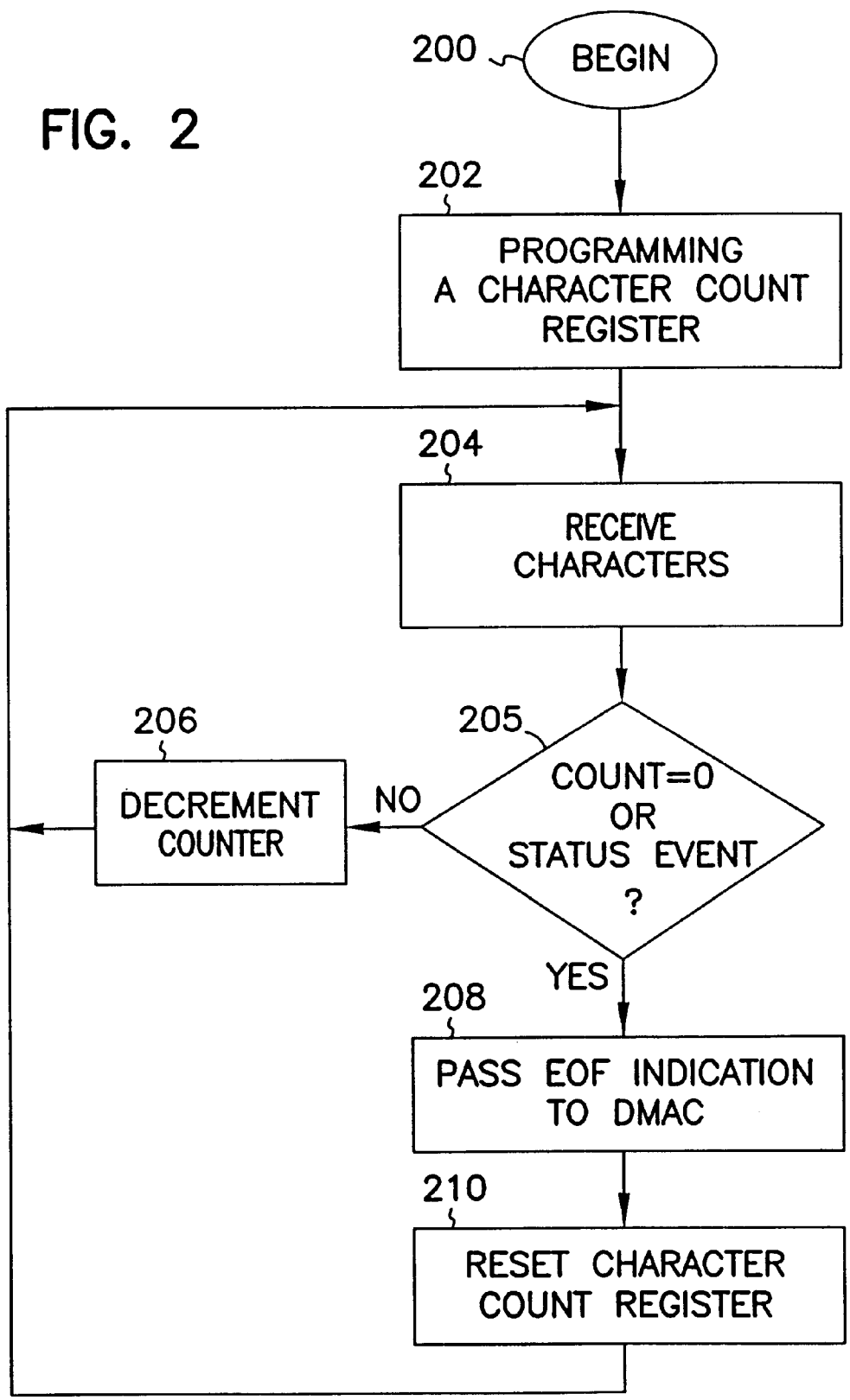
FIG. 2 is a flow chart that illustrates an embodiment of a process for controlling commands and data in a serial interface according to the teachings of the present invention.

FIG. 2 is a flow chart that illustrates an embodiment of a process for controlling commands and data in a serial port card according to the teachings of the present invention. One aspect of the process or method relates to programming a character count register to count the number of characters received by a serial controller of the serial interface.

The method begins at block 200. At block 202, the method includes programming a character count register with a maximum number of characters that a serial controller will send to a direct memory access controller (DMAC) between an end of frame (EOF) indication. According to the teachings of the present invention, the character count register is programmed to send an EOF signal to the multi-channel DMAC before the number of characters received at a serial port of the serial controller exceeds the size of a DMA buffer associated with a single DMA descriptor. At block 204, the method counts characters in an incoming data stream using the character count register. In one embodiment, counting the characters in an incoming data stream using the character count register includes counting the characters received by the serial controller 102 in an asynchronous data stream. At block 205, the method checks to see if the character count register has reached zero or whether a status event has occurred. In other words, the serial controller resolves whether the serial port of the serial controller has received the maximum number of character programmed into the character count register or whether an event programmed to generate an EOF signal has occurred. If neither of these events has occurred, then the method proceeds to block 206 and decrements the character count register for each character received and resumes counting characters at 204. Alternatively, if one of the above stated events occurs, then at block 208 the method passes an EOF signal from the serial controller to the DMAC. For example, after the maximum number of characters programmed into the character count register have been written to direct memory access (DMA) buffer the method passes an EOF signal from the serial controller to the DMAC. At block 210, the method resets the character count register and the process resumes at block 204. According to the teachings of the present invention, the character count register is reset any time the serial controller passes an EOF to the DMAC.

Figure 3:
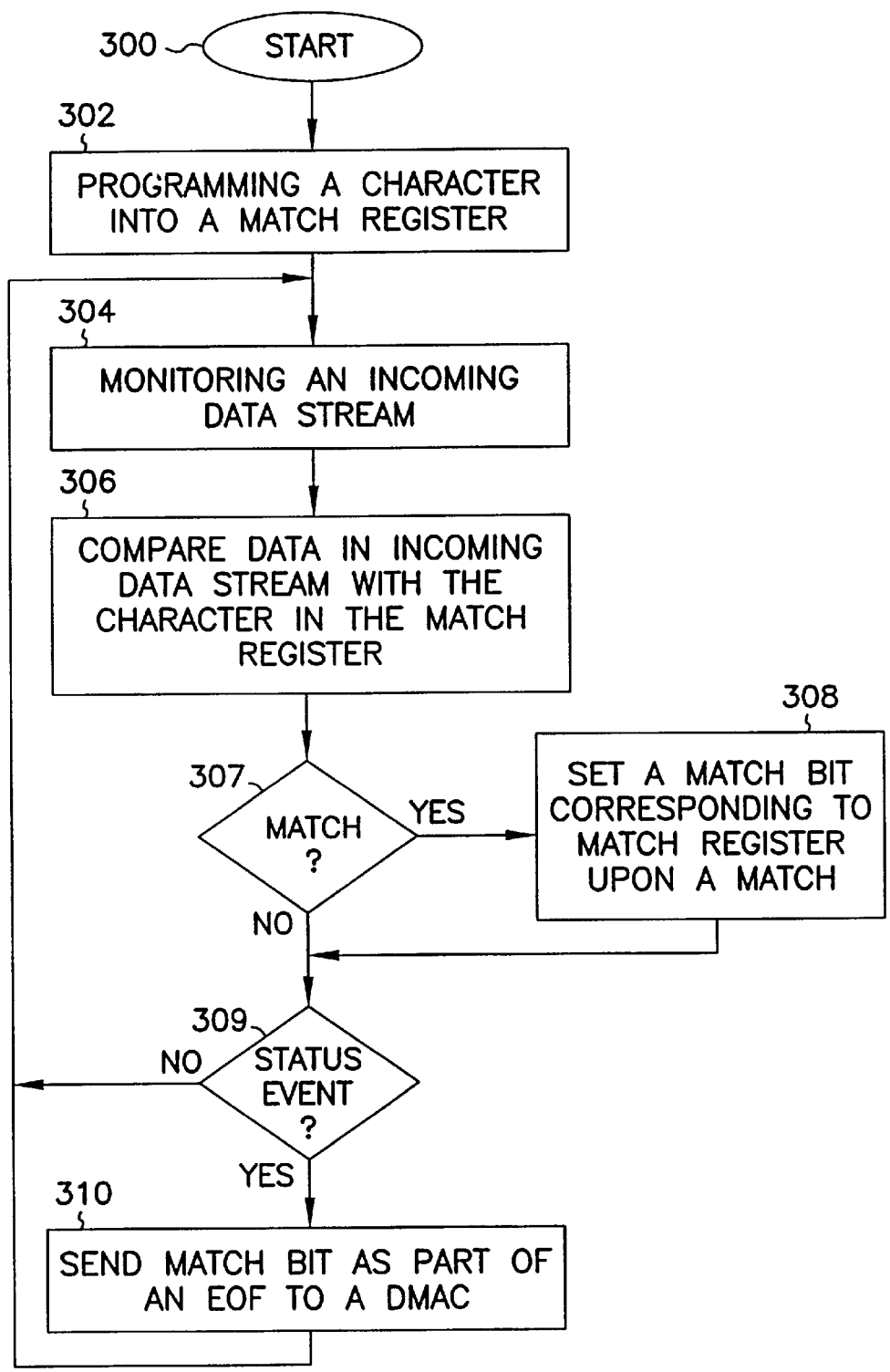
FIG. 3 is a flow chart that illustrates another embodiment of a process for controlling commands and data in a serial interface according to the teachings of the present invention.

FIG. 3 is a flow chart that illustrates another embodiment of a process for controlling commands and data in a serial interface according to the teachings of the present invention. One aspect of the process or method relates to programming a match register and comparing an incoming data stream, received by a serial controller of the serial interface, with the character in the match register.

The method begins at block 300. At block 302, the method includes programming a character into a match register. In one embodiment, the match register includes a programmable firmware match register. As explained and described in detail above, the programmed character can include either a data or a command programmed character. For example, the match register can be programmed with a command for halting transmission to the serial port card, e.g. an "XOFF" command. At block 304, the method monitors an incoming data stream. In one embodiment, monitoring an incoming data stream includes monitoring an asynchronous data stream. At block 306, the method compares data in the data stream with the character in the match register. At block 307, the serial controller 102 resolves whether a character received by the serial controller 102 in the incoming data stream matches the character in the match register. If a character received by the serial controller 102 matches the character in the match register, then the serial controller sets a match bit corresponding to the match register at block 308 and proceeds to block 309. If a character received by the serial controller 102 does not match the character in the match register, then the method proceeds directly to block 309 and the serial controller does not set a match bit. At block 309 the serial controller resolves whether a status event has occurred, e.g. an event programmed to generate an end of frame (EOF) signal. If a status event has not been received, then the process continues at block 304. Alternatively, if the serial controller resolves that a status event has occurred, then the method proceeds at block 310. At block 310 an EOF signal is sent by the serial controller to the direct memory access controller (DMAC). Here, if a match bit has been set, then the match bit is included and sent along as part of the EOF signal to the DMAC. In one embodiment, setting a match bit corresponding to the match register includes enabling an action by the serial interface. In this embodiment, enabling an action by the serial interface includes enabling an action selected from the group consisting of forcing an EOF signal, stopping a transmitter to cease transmission to the serial interface, and starting a transmitter to begin, or restart transmission to the serial interface. For example, enabling the serial interface to force an end of frame could correspond to a match bit being set which indicates a detection of the completion of a point-to-point protocol packet. Likewise, enabling the serial interface to stop a transmitter to cease transmission to the serial interface could correspond to a match bit being set which indicates a detection of the "XOFF" command in a serial data stream. One of ordinary skill in the art will understand upon reading this disclosure that enabling an action by the serial interface by setting a match bit includes enabling other suitable actions as well.

As explained and described in detail above, this method allows status, e.g. an EOF, to indicate the presence of the matched data somewhere in a buffer associated with a DMA descriptor. Thus, a processor can quickly locate and access the marked character, such as in the case when the marked character is a command character and an action needs to be immediately taken.

CONCLUSION

Systems and methods have been described that use a combination of character count register and a match register to control commands and data received by a serial controller in a serial interface. Essentially, the character count register ensures that every buffer descriptor includes status information, e.g. an EOF, from the serial controller which applies to data in that buffer. Additionally, the match register ensures that a match bit, corresponding to the match register, becomes part of the next EOF sent by the serial controller to the DMAC. This allows the status to indicate the presence of the matched data somewhere in a buffer associated with a DMA descriptor, even if no immediate action is enabled for the particular match register. In one embodiment, the character count register and the match register are used in combination. Thus, according to the operation of the present invention, every buffer descriptor will have status from the serial controller applied to it which applies only, or solely, to that buffer descriptor. Advantageously, this allows for greater accessibility and more precise control over the location of commands and data received by a serial controller in a serial interface.

Although specific embodiments have been illustrated and described herein, it will be appreciated by those of ordinary skill in the art that any arrangement which is calculated to achieve the same purpose may be substituted for the specific embodiment shown. This application is intended to cover any adaptations or variations of the present invention.

What is claimed is:

1. A method for controlling commands and data in a serial interface, the method comprising:
   programming a character count register with a maximum number of characters for a serial controller to send to a direct memory access controller (DMAC) before an end of frame (EOF) signal;
   counting characters in an incoming data stream using the character count register;
   passing an EOF signal to the DMAC after the maximum number of characters have been written to a direct memory access (DMA) buffer; and
   resetting the character count register when the serial controller passes an EOF to the DMAC.

2. The method of claim 1, wherein programming the character count register with a maximum number of characters includes programming the maximum number of characters to be less than a size of a DMA buffer associated with a single DMA descriptor.

3. The method of claim 1, wherein passing the EOF signal to the DMAC includes passing a status to the DMAC.

4. The method of claim 3, wherein passing the EOF signal to the DMAC includes advancing the DMAC to a next DMA buffer descriptor such that every DMA buffer descriptor includes a status from the serial controller that applies only to that DMA buffer descriptor.

5. The method of claim 1, wherein the method further includes assigning a character count register to each port in the serial controller.

6. The method of claim 1, wherein programming a character count register with a maximum number of characters includes programming a twelve-bit character count register.

7. The method of claim 1, wherein programming a character count register with a maximum number of characters includes programming a firmware character count register in the serial controller.

8. A method for controlling commands and data in a serial interface, the method comprising:
   programming a character count register with a maximum number of characters for a serial controller to send to a direct memory access controller (DMAC) before an end of frame (EOF) signal;
   counting characters in an incoming data stream using the character count register;
   passing an EOF signal to the DMAC after the maximum number of characters have been written to a direct memory access (DMA) buffer;
   resetting the character count register when the serial controller passes an EOF to the DMAC; and
   monitoring characters in an incoming data stream.

9. The method of claim 8, wherein programming the character count register with a maximum number of characters includes programming the maximum number of characters to be less than a size of a direct memory access (DMA) buffer associated with a single DMA descriptor.

10. The method of claim 9, wherein monitoring characters comprises:
    programming a character into a match register;
    comparing data in the data stream with the character in the match register;
    when a character in the incoming data stream matches the character programmed in the match register, setting a match bit corresponding to the match register; and
    including the match bit as part of a next EOF.

11. The method of claim 10, wherein including the match bit as part of a next EOF includes indicating the presence of the matched character in the buffer associated with a single direct memory access (DMA) descriptor.

* * * * *